US007462102B1

(12) United States Patent
Mendola et al.

(10) Patent No.: US 7,462,102 B1

(45) Date of Patent: Dec. 9, 2008

(54) METHOD FOR PLAYING A CARD GAME HAVING A BONUS BET

(76) Inventors: Todd Michael Mendola, 32105 Jefferson, Saint Clair Shores, MI (US) 48082; Michael Edward Chevalier, 22930 Arcadia St., Saint Clair Shores, MI (US) 48082

(*) Notice: Subject to any disclaimer, the term of this patent is extended or adjusted under 35 U.S.C. 154(b) by 441 days.

(21) Appl. No.: 10/974,565

(22) Filed: Oct. 27, 2004

(51) Int. Cl.
*G06F 17/00* (2006.01)
*G06F 19/00* (2006.01)

(52) U.S. Cl. .......................... 463/11; 463/12; 463/13; 273/292

(58) Field of Classification Search ............ 463/11–13; 273/292

See application file for complete search history.

(56) References Cited

U.S. PATENT DOCUMENTS 5,636,843 A 6/1997 Roberts
5,678,821 A 10/1997 Hedman
5,839,730 A * 11/1998 Pike ......................... 273/292
5,951,012 A 9/1999 Feola
6,012,719 A 1/2000 Webb
6,029,976 A 2/2000 Brunelle
6,179,293 B1 1/2001 Hedman
6,206,375 B1 * 3/2001 Wichinsky ................. 273/292
6,371,867 B1 4/2002 Webb
6,394,456 B1 * 5/2002 Long ......................... 273/292
6,481,717 B1 11/2002 Richardelle
6,481,719 B2 11/2002 Webb
6,523,831 B2 2/2003 Webb
6,749,200 B2 6/2004 Yurkins
6,863,274 B2 3/2005 Webb
6,874,786 B2 4/2005 Bruno et al.
6,877,748 B1 4/2005 Patroni et al.
6,902,167 B2 * 6/2005 Webb ......................... 273/292
7,040,625 B1 5/2006 D'Avanzo
7,086,943 B2 8/2006 Mugnolo et al.
2001/0035610 A1 11/2001 Webb
2001/0040344 A1 * 11/2001 Zahedi ..................... 273/274
2002/0000693 A1 1/2002 Webb
2002/0036382 A1 * 3/2002 Brunelle ................... 273/292
2002/0113371 A1 * 8/2002 Snow ........................ 273/292
2004/0000758 A1 1/2004 Yurkins
2004/0070146 A1 * 4/2004 Snow ........................ 273/292
2004/0164491 A1 * 8/2004 Webb ........................ 273/274
2005/0116414 A1 6/2005 Yurkins

* cited by examiner

*Primary Examiner*—John M Hotaling, II
*Assistant Examiner*—Milap Shah
(74) *Attorney, Agent, or Firm*—John G. Chupa, P.C.

(57) ABSTRACT

A method 400 for conducting a gaming business which is based upon a new and novel gaming methodology 66 which requires an initial bonus round of play and a later blackjack round of play. The business methodology dramatically reduces required initial capital expenditures and dramatically increases profits.

4 Claims, 3 Drawing Sheets

METHOD FOR PLAYING A CARD GAME HAVING A BONUS BET

FIELD OF THE INVENTION

The present invention generally relates to a method for conducting a business and more particularly, to a method for conducting a gaming business by the use of a new and novel game which advantageously combines elements of a known game and other elements to increase playing enjoyment and by the use of anew and novel business strategy which allows increased levels of profits to be realized and initial capital expenditures to be dramatically reduced.

BACKGROUND OF THE INVENTION

Gaming is a very popular and profitable endeavor and various gaming facilities exist to promote and profit from these gaming activities. While these businesses exist, they generally all provide the same sort of games, thereby making it relatively difficult to differentiate themselves to the public. Further, the business strategy of these businesses has traditionally been limited to creating or building one or more facilities in which gaming occurs, thereby requiring a relatively large "upfront" capital expenditure investment and an ongoing operational expense which erodes the overall profit margin. While this business approach does allow a gaming business to be profitably run, it fails to recognize other revenue generation potential, especially the revenue potential associated with a new and novel game being exploited in a new and novel fashion.

There is therefore a need for a new and improved method for conducting a gaming business which overcomes some or all of the various disadvantages current gaming business including, but not limited to those which have been delineated above.

SUMMARY OF THE INVENTION

It is a first non-limiting object of the present invention to provide a method for conducting a gaming business which overcomes some or all of the previously delineated drawbacks of prior methods for conducting a gaming business, including but not limited to those which have been delineated above.

It is a second non-limiting object of the present invention to provide a method for conducting a gaming business which overcomes some or all of the previously delineated drawbacks associated with prior methods for conducting a gaming business in a new and novel licensing manner.

It is third non-limiting object of the present invention to provide a method for conducting a gaming business which overcomes some or all of the previously delineated drawbacks associated with prior methods for conducing a gaming business by the use of new and novel game which includes elements of traditional blackjack play and new and novel elements.

According to a first non-limiting aspect of the present invention, a method for conducting a gaming business is provided and includes the steps of creating a game which requires a bonus bet; a bonus award determination; and blackjack play which occurs only after the bonus bet and the bonus award determination are made; and using the created game to solicit the bonus bet and to solicit a bet on the blackjack play, thereby generating play revenue.

According to a second non-limiting aspect of the present invention, a method for conducting a gaming business is provided. Particularly, the method includes the steps of creating a game involving a bonus round of play and a blackjack round of play; and selectively licensing the created game to at least one gaming establishment, thereby creating a royalty stream of revenue based upon the amount of play of the created game.

According to a third non-limiting aspect of the present invention, a method for conducting a gaming business is provided. Particularly, the method includes the steps of creating a game involving a bonus round of play and a blackjack round of play; and selectively licensing the created game to at least one gaming establishment, the license generating a royalty stream which is based upon the amount of money which is received by the gaming establishment as a result of the play of the licensed game.

According to a fourth non-limiting aspect of the invention, a method for conducting a gambling business is provided. The method includes the steps of creating a website which includes a game which may be played over a global communications network and which involves a bonus round of play followed by a blackjack round of play; using said game to solicit bets; and paying a certain amount of money received from said solicited bets while retaining the remainder.

These and other features, aspects, and advantages of the present invention will become apparent from a reading of the following detailed description of the preferred embodiment of the invention, including the subjoined claims, and by reference to the following drawings.

DETAILED DESCRIPTION OF THE PREFERRED EMBODIMENT OF THE INVENTION

Figure 1:
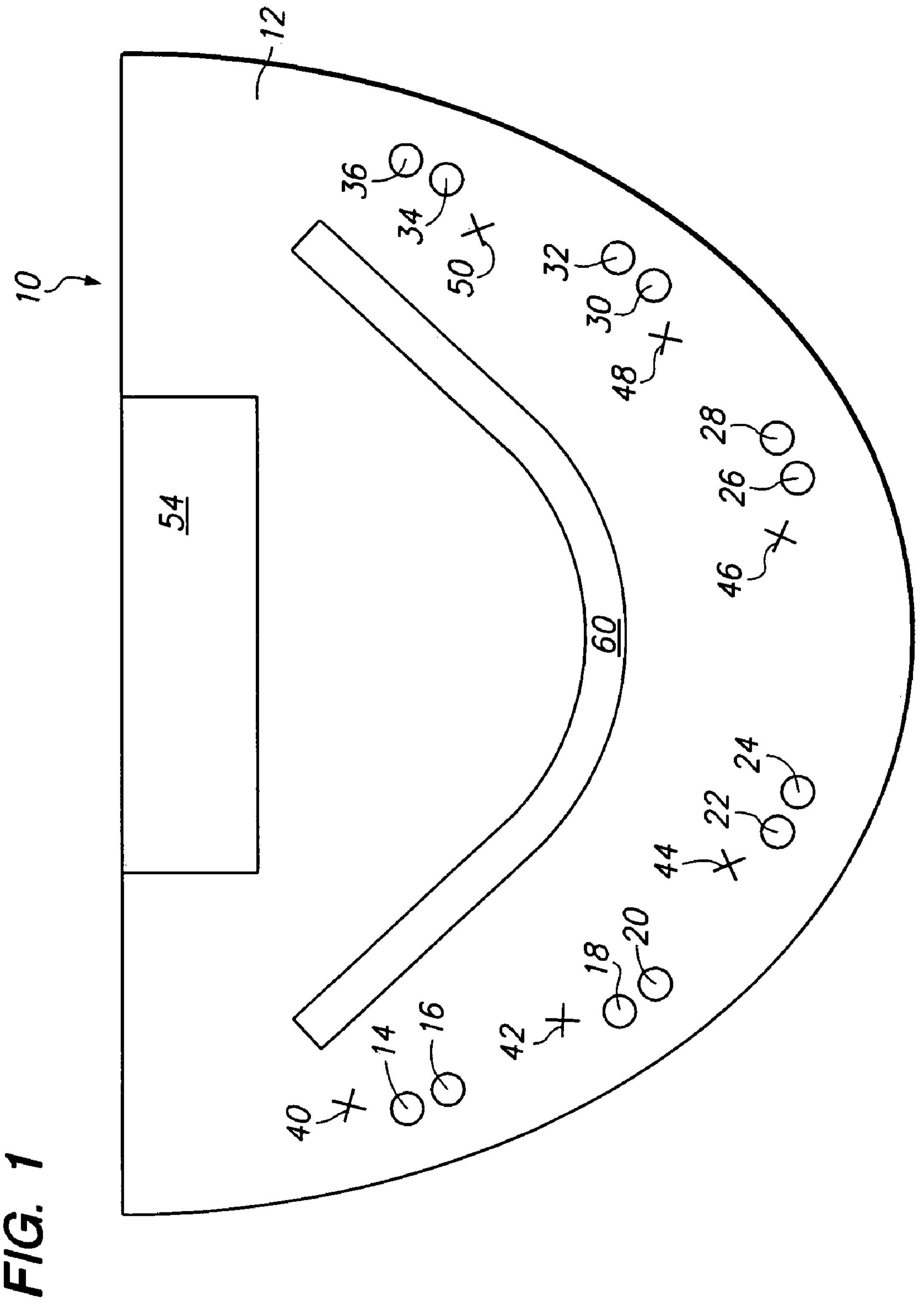
FIG. 1 is a game board which is made in accordance with one non-limiting aspect of the present invention and which may be used to play the various non-limiting game methodologies of each non-limiting embodiment of the invention.

Referring now to FIG. 1, there is shown a game board or playing portion 10 which is made in accordance with one non-limiting embodiment of the invention and which may be used to selectively play the various gaming methodologies of the present invention.

Particularly, game board or portion 10 includes a playing portion 12 which may be, in one non-limiting embodiment, adapted to be removably attached to or to selectively overlay the top of a table or other flat structure. In one non-limiting and selectively removable embodiment, the playing portion 12 may be constructed from plastic, felt, or another type of commercially available material. Alternatively, the game portion 12 may be integrally formed within a structure, such as within the top of a table or imprinted upon this structure.

As shown, the playing portion 12 includes substantially identical card reception portions 14, 16, 18, 20, 22, 24, 26, 28, 30, 32, 34, and 36 and, in this embodiment, these portions

14-36 are arranged in pairs. Particularly, the pairs are respectively formed by portions 14, 16; 18, 20; 22, 24; 26, 28; 30, 32; and 34, 36. Proximately and respectively positioned to each such pair 14, 16; 18, 20; 22, 24; 30, 32; and 34, 36 is a substantially identical and respective bonus playing portion 40, 42, 44, 46, 48, and 50. It should be realized that while the portions 14-36 are shown as being substantially circular in shape, that nothing in this description is meant to limit there geometric configuration in this manner. Rather, the shape of these portions 14-36 may be generally elliptical, oval, square, rectangular or of any other desired shape and size. Further, the portion 14-36 may not even be substantially similar in size and shape. Moreover, the shape of portions 40-50 may also be of substantially any desired geometric configuration, such as an "x", a dot, a circle, a square, or any other shape or size and that these portions 40-50 may also have a dissimilar size and shape and any desired geometric configuration.

As is further shown in FIG. 1, the playing portion 10 includes a substantially square or rectangularly shaped playing portion 54 which is meant to be proximate to a dealer and to contain the cards which are played by the dealer in the manner which is discussed in greater detail below. In one non-limiting embodiment, portion 54 is referred to as the "dealer rack" portion and is the area in which the chips are kept for the gaming establishment which are used by the dealer to pay or take player bets. Further, the playing portion 10 includes an accurate separation portion 60 which separates the dealer's cards and play portion from the player's playing portion. Portion 60 may also be of any substantially desired shape and size. In one non-limiting embodiment, portion 60 is referred to as "the insurance line" and allows a "side bet" to occur during a game or round or hand of blackjack. Particularly, this "insurance side bet" is only played when the dealer receives two cards and the first card which has an exposed face portion and which is controlled or given to the dealer comprises an ace. If this occurs, during a round or hand of blackjack, then the players can place a bet, within portion 60, that the exposed card and the second unexposed card of the dealer cooperatively form a blackjack or cooperatively total twenty-one. The allowed bet is typically one half of a players' original blackjack wager, for each portion 14-36 that the player controls. If the dealer has a blackjack, then the players who bet within portion 60 receive twice the amount of money which they respectively bet. This betting occurs after the bonus round, discussed below, and before the blackjack round begins. It should be appreciated that the playing portion 12 may also have any desired shape and size and that nothing in this description is meant to limit the playing portion 12 to any particular size and shape and that the playing portion 12 may be formed in the top of a table or other such object. It should be further appreciated that playing portion 10) may also reside upon a computer, operable under stored program control, and played electronically.

Figure 2:
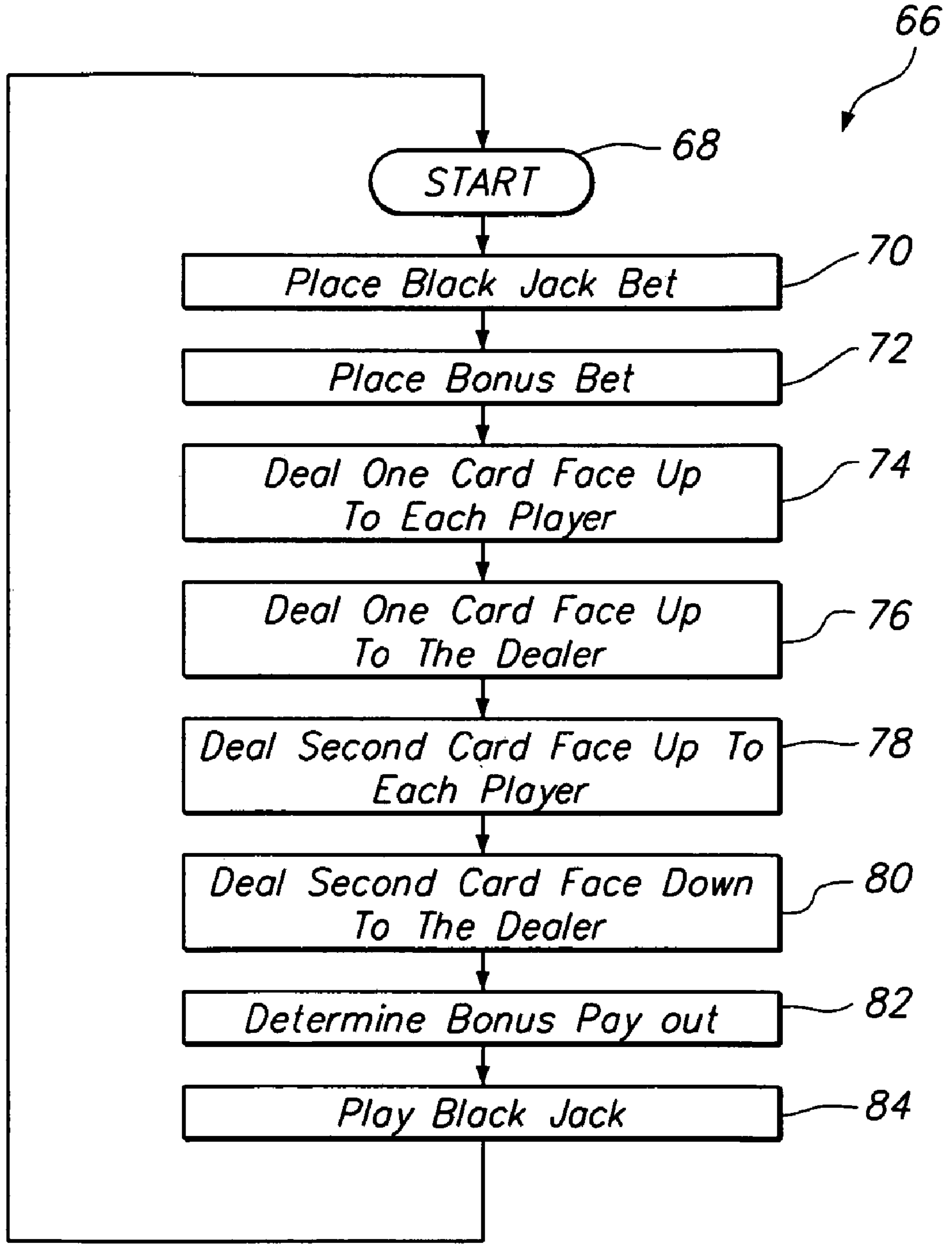
FIG. 2 is a flowchart illustrating the sequence of steps associated with the game methodologies of the various embodiments of the invention.

Referring now to FIG. 2, there is shown a flowchart or methodology 66 which includes a sequence of steps which cooperatively comprises the various gaming methodologies of the invention.

Particularly, the methodology 66 begins with an initial step 68 in which the dealer and/or the gaming house declare or denotes that a new game is to begin. Step 68 is followed by step 70 in which each participating player places a blackjack bet. Importantly, in this gaming methodology, each player "controls" (e.g., exclusively and selectively plays while playing the gaming methodology of this invention by use of portion 10, a pair of playing portions 14, 16; 18, 20; 22, 24; 26, 28; 30, 32; and 34, 36. That is, each playing portion 14-36 in a pair may include or separately receive a blackjack bet and a separate blackjack game is played within, upon, or proximate to each playing portion 14-36 for which a bet has previously been made. Step 72 follows step 70 and, in this step 72, each player, if they desire, respectively places a bonus bet on the portion 40-50 which is respectively proximate to the pair of playing portions 14-36 which they respectively control. For example, if a player controls playing portions 22, 24, that player would, if desired, place a bonus bet on the bonus playing portion 44. In one non-limiting embodiment, a bonus bet may only be placed by a player who has placed separate blackjack bets on each of the pair of playing portions 14-36 controlled by that player.

Step 74 follows step 72 and, in this step 74, the dealer provides one card to each player for each playing portion 14-36 for which a blackjack bet has been placed. These cards each have their face portion exposed or "turned upwards". Step 74 is followed by step 76 in which the dealer receives a single card having its face portion exposed or "turned upward". Step 78 follows step 76 and, in this step 78, the dealer provides another card to each player for each playing portion 14-36 for which a blackjack bet has been placed. Step 80 follows step 78 and, in this step 80, the dealer receives a second card having its face portion hidden or "turned downwards". Step 82 follows step 80 and, in this step 82, a bonus payout is determined.

In one non-limiting embodiment, the bonus bet, placed on each portion 40-50 may selectively vary by any desired range (e.g., from at least the sum of one dollar to the sum of five dollars). In another non-limiting embodiment, the player obtains the bonus only if the combination of the four cards that the player receives and the exposed card with is controlled by the dealer cooperatively constitutes a poker hand of at least a certain value (e.g., two pair). In yet, another non-limiting embodiment, a bonus is paid only to a player if the cards form a blackjack in at least one of the portions 14-36 which the player controls and an original bonus bet was made by the player in one of the bonus portions 40-50. The payout, for each such bonus bet, may also vary within any desired range (e.g., from a multiple of about one to about 2500 of the original bet.) and an even greater payout may be used if both portions 14-36 controlled by a player actually "win" (e.g., both constitute a blackjack or a poker hand of a certain value) Step 84 follows step 82 in which the game of blackjack is then played in the regular manner. Step 84 is followed by step 68.

It should be realized that the amount of the amount of each bonus wager may be limited, as desired, to between one dollar and five dollars, or some other desired limit and the amount of a bonus payout may also be similarly confined within a certain desired range of value. For example, two blackjacks for a player (e.g., one occurring in each of the pair of playing portions 14,16,18,20;22,24; 26,28;30,32; and 34,36 which that player controls) may pay four times the bonus bet, while in the alternate embodiment a poker hand constituting "two pair" may pay twice the bonus bet. For a review of poker hand valuation the reader is directed to the text entitled *Bobby Baldwin's Winning Poker Secrets* by Mike Caro and *Poker at The Millennium* by Mike Caro which are each available from the website www.conjelco.com and which are each fully and completely incorporated herein by referee, word for word and paragraph for paragraph.

It is to be understood that the invention is not limited to the exact construction and method which has been illustrated and discussed above but that various changes and modifications may be made without departing from the spirit and the scope of the inventions as are more further delineated in the following claims. In yet another non-limiting embodiment of the invention, the bonus round may be based upon the number of blackjack hands cooperatively held by all of the players during the bonus round (i.e., a increasing bonus payout is made as the number of blackjacks increases for a round).

Figure 3:
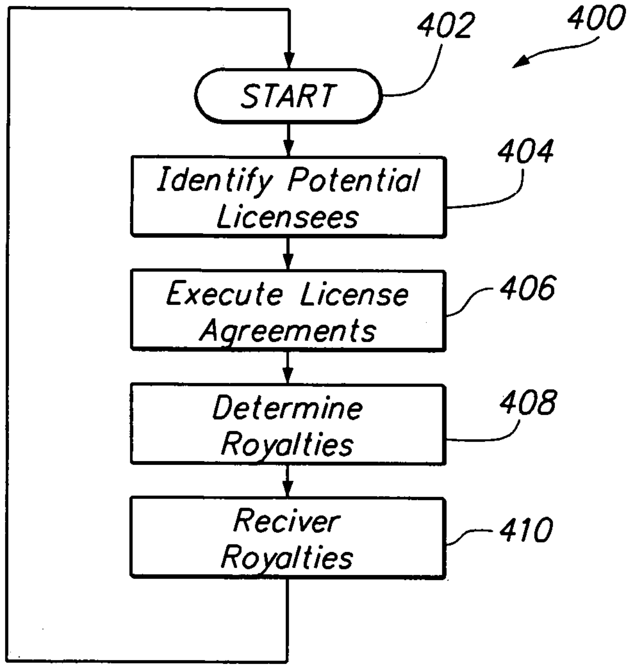
FIG. 3 is a flowchart which includes the steps which cooperatively comprise a business methodology of the preferred embodiment of the invention.

Referring now to FIG. 3, there is shown a flowchart 400 which includes a sequence of steps which cooperative comprise the new and novel business methodology of the preferred embodiment of the invention.

Particularly, business method or flowchart 400 begins with an initial step 402 in which the business methodology 400 begins. Step 402 is followed by step 404 in which potential licenses of the gaming methodology which has been previously described, by way of example and without limitation with respect to FIGS. 1 and 2, are identified. Step 404 is followed by step 406 in which appropriate license agreements are executed between the owner of this gaming methodology and the various previously identified licensees. In one non-limiting embodiment of the invention, the owner of the foregoing business methodology obtains a revenue stream based upon the money received by each of the licensees (e.g., gross revenue or profits that each licensee receives from the operation of the game) and in another non-limiting type of license arrangement the owner of this business methodology receives an amount of money which is based only upon the quantity or the amount of players lured into playing the game over a certain period of time. Other royalty metrics may be used in alternate embodiments of the invention.

Step 408 follows step 406 and, in this step 408, the amount of royalties which are owed to the licensor (e.g., to the owner of the business methodology) are determined or calculated. Step 410 follows step 408 and, in this step 410, the royalty payments are received by the licensor. The term of each license may extend to the termination of applicable patent protection on the methodology or may extend to some other mutually agreeable term.

It should be appreciated that the owner of the foregoing business methodology and assembly and business method may receive gaming revenue, under the foregoing business model or strategy, without actually building a gaming facility or incurring ongoing operational expense and that the licensed game may be given to only one gaming facility in a designated geographic area, thereby allowing the licensed gaming facility to truly differentiate itself from its competition, thereby driving revenue growth and increasing the valuable nature of the licensed game. Hence, this business strategy allows increasing levels of profits to be realized while concomitantly reducing required capital expenditures.

Figure 4:
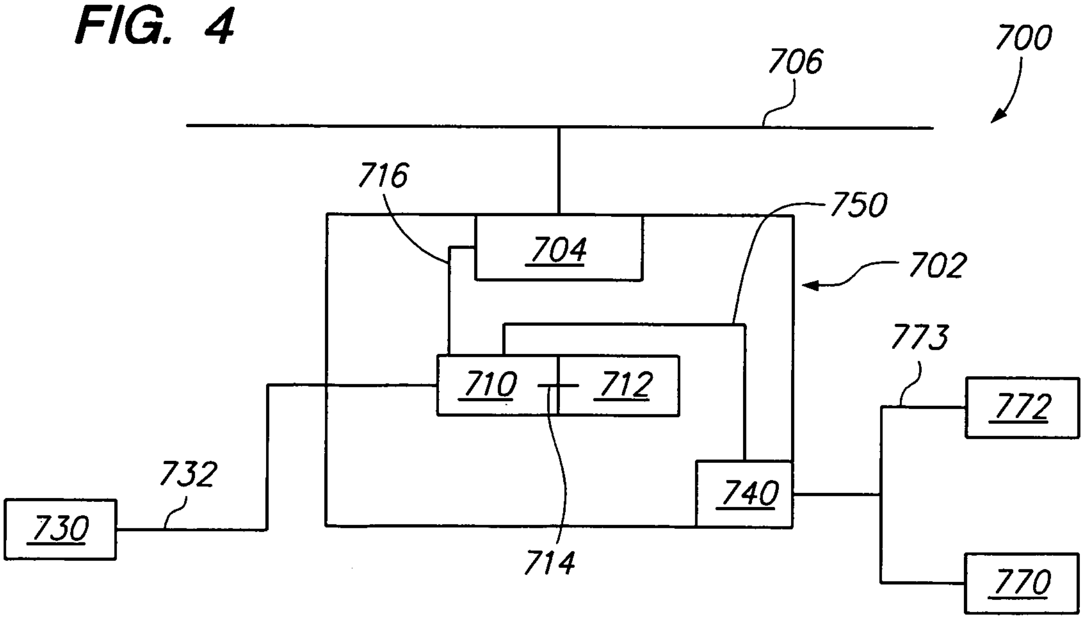
FIG. 4 is an assembly made in accordance with the teachings of an alternate embodiment of the invention which allows the gaming methodology of the invention to be used in a desired business context.

Referring now to FIG. 4 there is shown an assembly 700 which is made in accordance with the teachings of an alternate embodiment of the invention and which allows the foregoing new and novel gaming methodology to be used in a different business context.

Particularly, the assembly 700 includes a computer 702 which is operable under stored program control and which is communicatively coupled, through a communications portion 704 to a global communications network 706, such as and without limitation to the Internet.

The assembly 700 includes a processor 710 and a memory portion 712 which is physically and communicatively coupled to the process or 710 by the use of bus 714. The processor 710 is further physically and communicatively coupled to the communications portion 704 by the bus 716, and the assembly 700 includes a source of electrical power 730 which is physically coupled to the processor 710 by bus 732.

The assembly 700 further includes an input/output portion 740 which is physically and communicatively coupled to the processor 710 by bus 750 and the assembly 700 includes a display 770 and a input device (e.g., a key board) 772 which are each physically and communicatively coupled to the input output portion by the bus 773.

Particularly, the control software resides within memory 712 and allows in cooperative combination with portion 704 and processor 710, allows the gaming portion 10 to be operably incorporated within a website and, in this manner, allows remote users to make bets and to play the game accordingly to the foregoing methodologies. Thus, this Internet gaming business approach allows the user of this gaming methodology to either license the inventor or use it as part of an Internet gaming venture. It should be further understood that nothing in this description is meant to limit the invention to a particular type of computer system and that assembly 700 is but one non-limiting example of an operational platform upon which the gaming methodology to be performed. Hence, other computerized platforms may be used instead of assembly 700 and, in yet another alternative embodiment of the invention, assembly 700 may constitute on computerized gaming device which allows only "local play" (i.e., the game is played by means of portions 770, 772 only.

It is to be understood that the invention is not limited to the exact construction and method which has been illustrated and discussed above but that various changes and modifications may be made without departing from the spirit and the scope of the inventions as are more further delineated in the following claims. The games of blackjack and poker are also explained in *Hoyle's Rules of Games*—3rd Ed.(Is BN-0-451-20484-0) which is published by Signet publishing and which is fully and completely incorporated herein by reference, word for word and paragraph for paragraph.

What is claimed is:

1. A method for conducting a game comprising the steps of:

determining whether a plurality of bonus bets in said game will be based upon one of the following criteria: a poker hand value, a quantity of blackjacks obtained by a first player, and a quantity of blackjacks obtained by said first player and a second player, wherein said determined criteria during a current play of a game is different from the previous play of said game; and after determining said criteria for said plurality of bonus bets, performing said game in the following manner:

soliciting and receiving a first blackjack bet, a second blackjack bet, and a first bonus bet from said first player;

soliciting and receiving a third blackjack bet, a fourth blackjack bet, and a second bonus bet from said second player;

giving a first pair of cards to said first player;

associating said first pair of cards with said first blackjack bet;

giving a second pair of cards to said first player;

associating said second pair of cards with said second blackjack bet;

giving a third pair of cards to said second player;

associating said third pair of cards with said third blackjack bet;

giving a fourth pair of cards to said second player;

associating said fourth pair of cards with said fourth blackjack bet;

providing a fifth pair of cards;

determining whether to pay money to said first player for said first bonus bet;

wherein said money will be paid to said first player only if the poker hand value of the combination of said first pair of cards, said second pair of cards, and one card from said fifth pair of cards exceeds a certain value and it was previously determined to base plurality of bonus bets on a poker hand value;

wherein said money will be paid to said first player only if at least one of said first pair of cards and said second pair of cards respectively and cooperatively form blackjacks, and it was previously determined to base said plurality of bonus bets upon a quantity of blackjacks obtained by said first player;

wherein said money will be paid to said first player only if a quantity of blackjacks respectively formed by said first pair of cards, said second pair of cards, said third pair of cards, and said fourth pair of cards exceeds a predetermined value, and it was previously determined to base said plurality of bonus bets on the quantity of blackjacks obtained by said first player and said second player;

taking said first bonus bet from said first player if it was determined that no money should be paid to said first player;

determining whether to pay money to said second player for said second bonus bet;

wherein said money will be paid to said second player only if the poker hand value of the combination of said first pair of cards, said second pair of cards, and one card from said fifth pair of cards exceeds a certain value and it was previously determined to base plurality of bonus bets on a poker hand value;

wherein said money will be paid to said second player only if at least one of said third pair of cards and said fourth pair of cards respectively and cooperatively form blackjacks, and it was previously determined to base said plurality of bonus bets upon a quantity of blackjacks obtained by said second player;

wherein said money will be paid to said second player only if a quantity of blackjacks respectively formed by said first pair of cards, said second pair of cards, said third pair of cards, and said fourth pair of cards exceeds a predetermined value, and it was previously determined to base said plurality of bonus bets upon a quantity of blackjacks obtained by said first player and said second player;

taking said second bonus bet from said second player if it was determined that no money should be paid to said second player;

comparing said first pair of cards with said fifth pair of cards and doing one of paying money to said first player and taking the said first blackjack bet based upon said comparison;

comparing said second pair of cards with said fifth pair of cards and doing one of paying money to said first player and taking the said second blackjack bet based upon said comparison;

comparing said third pair of cards with said fifth pair of cards and doing one of paying money to said second player and taking the said third blackjack bet based upon said comparison; and comparing said fourth pair of cards with said fifth pair of cards and doing one of paying money to said second player and taking the said fourth blackjack bet based upon said comparison.

2. The method of conducting a gaming business as set fourth in claim 1, further comprising the step of: letting said first or said second player retain one of said blackjack bets depending upon a comparison of said pair of cards associated with a certain one of said blackjack bets and said fifth pair of cards.

3. A method for conducting a game comprising the steps of:

determining whether a plurality of bonus bets in said game will be based upon one of the following criteria: a poker hand value, a quantity of blackjacks obtained by a first player, and a quantity of blackjacks obtained by said first player and a second player, wherein each player may independently determine what criteria they want to use during a current play of said game; and after determining said respective criteria for each player, performing said game in the following manner:

soliciting and receiving a first blackjack bet, a second blackjack bet, and a first bonus bet from said first player;

soliciting and receiving a third blackjack bet, a fourth blackjack bet, and a second bonus bet from said second player;

giving a first pair of cards to said first player;

associating said first pair of cards with said first blackjack bet;

giving a second pair of cards to said first player;

associating said second pair of cards with said second blackjack bet;

giving a third pair of cards to said second player;

associating said third pair of cards with said third blackjack bet;

giving a fourth pair of cards to said second player;

associating said fourth pair of cards with said fourth blackjack bet;

providing a fifth pair of cards;

determining whether to pay money to said first player for said first bonus bet;

wherein said money will be paid to said first player only if respective cooperative poker hand values of a combination of one of said first pair of cards and said fifth pair of cards and said second pair of cards and said fifth pair of cards exceeds a certain value and it was previously determined by said first player to base said first bonus bet on a poker hand value;

wherein said money will be paid to said first player only if at least one of said first pair of cards and said second pair of cards respectively and cooperatively form blackjacks, and it was previously determined by said first player to base said first bonus bet upon a quantity of blackjacks obtained by said first player;

wherein said money will be paid to said first player only if a quantity of blackjacks respectively formed by said first pair of cards, said second pair of cards, said third pair of cards, and said fourth pair of cards exceeds a predetermined value, and it was previously determined by said first player to base said first bonus bet upon a quantity of blackjacks obtained by said first player and said second player;

taking said first bonus bet from said first player if it was determined that no money should be paid to said first player;

determining whether to pay money to said second player for said second bonus bet;

wherein said money will be paid to said second player only if respective cooperative poker hand values of a combination of one of said third pair of cards and said fifth pair of cards and said fourth pair of cards and said fifth pair of cards exceeds a certain value and it was previously determined by said second player to base said second bonus bet on a poker hand value;

wherein said money will be paid to said second player only if at least one of said third pair of cards and said fourth pair of cards respectively and cooperatively form blackjacks, and it was previously determined by said second player to base said second bonus bet upon a quantity of blackjacks obtained by said second player;

wherein said money will be paid to said second player only if a quantity of blackjacks respectively formed by said first pair of cards, said second pair of cards, said third pair of cards, and said fourth pair of cards exceeds a predetermined value, and it was previously determined by said second player to base said second bonus bet upon a quantity of blackjacks obtained by said first player and said second player;

taking said second bonus bet from said second player if it was determined that no money should be paid to said second player;

comparing said first pair of cards with said fifth pair of cards and doing one of paying money to said first player and taking the said first blackjack bet based upon said comparison;

comparing said second pair of cards with said fifth pair of cards and doing one of paying money to said first player and taking the said second blackjack bet based upon said comparison;

comparing said third pair of cards with said fifth pair of cards and doing one of paying money to said second player and taking the said third blackjack bet based upon said comparison; and comparing said fourth pair of cards with said fifth pair of cards and doing one of paying money to said second player and taking the said fourth blackjack bet based upon said comparison.

4. The method of conducting a gaming business as set fourth in claim 3, further comprising the step of: letting said first or said second player retain one of said blackjack bets depending upon a comparison of said pair of cards associated with a certain one of said blackjack bets and said fifth pair of cards.

* * * * *